3,595,852
MONOAZO DYESTUFFS CONTAINING A THI-
AZOLYLMERCAPTOALKYLAMINO GROUP
Rasso Hahn, Basel, and Curt Mueller, Binningen, Basel-
Land, Switzerland, assignors to Sandoz Ltd. (also known
as Sandoz A.G.), Basel, Switzerland
No Drawing. Filed July 1, 1968, Ser. No. 741,338
Claims priority, application Switzerland, July 11, 1967,
9,882/67
Int. Cl. C07c 107/00; C09b 29/36; D06p 1/04
U.S. Cl. 260—158                             11 Claims

ABSTRACT OF THE DISCLOSURE

Disperse dyes of the monazo series with a heterocyclic diazo component and a thiazolyl-mercapto-alkylamino substituted coupling component of the benzene series, having outstanding fastness properties, especially excellent thermofixation fastness. The dyes build up excellently from aqueous dispersions on textiles of fully synthetic or semi-synthetic hydrophobic organic substances of high molecular weight. They are useful for dyeing fibers of linear aromatic polyester, cellulose acetate, cellulose triacetate, synthetic polyamide, polyolefins, acrylonitrile copolymers and polyvinyl compounds.

This invention relates to a process for the production of disperse dyes which are notable for their excellent fastness to dry heat thermofixation.

It has been found that dyes of formula

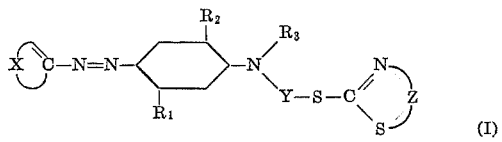

(I)

which are free from water solubilizing groups, are eminently suitable for application as disperse dyes.

In Formula I $R_1$ stands for a hydrogen or halogen atoms, an alkyl or alkoxy group or an —NH—acyl radical;
$R_2$, for a hydrogen or halogen atom or an alkyl or alkoxy group;
$R_3$, for a hydrogen atoms or an alkyl or cycloalkyl radical;
X and Z, independently of each other, for an atom chain completing a heterocyclic ring, which may be substituted and/or may bear a further ring system condensed on it; and
Y for a divalent organic radical which may be substituted and may be interrupted by an oxygen atom. Carboxylic acid and sulphonic acid groups are examples of water solubilizing groups from which the dyes of this invention are free.

Chlorine and bromine atoms may be named as specially suitable halogen atoms. Th ealkyl and alkoxy groups in the dye molecule are preferably of low molecular weight, i.e. bearing 1, 2, 3, or 4 carbon atoms, and they may be substituted by chlorine or bromine atoms, alkoxy, cyanalkoxy, pyridyl, cyano, hydroxyl, acyl, phenyl or phenoxy radicals, of which the phenyl and phenoxy radicals may be further substituted. The cyclohexyl radical is a preferred cycloalkyl radical and like the alkyl groups it may be substituted. Non-water-soluble acyl radicals are, for example, those of formula R—P— and R'—Q—, where R represents a hydrocarbon radical, preferably a lower alkyl radical or a phenyl radical, which as defined above may be substituted and/or may contain hetero atoms, P represents —O—CO— or —SO$_2$—, R' a hydrogen atom or R, Q is —CO—, —NR"—CO— or —NR"—SO$_2$— and R" a hydrogen atom or R.

The radicals of formula

are preferably radicals of five-membered heterocyclic compounds of aromatic character which may be substituted, for example, by halogen atoms, in particular chlorine or bromine atoms, nitro, cyano, alkyl, alkoxy, acyl or acylamino groups (all as defined above). Preferred members of these groups of radicals are thiazolyl, isothiazolyl, benzothiazolyl, thiophenyl, imidazolyl, 1, 2, 4- or 1, 3, 4-thiadiazolyl, pyrazolyl, triazolyl or tetrazolyl radicals. A preferred radical of formula

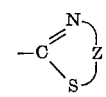

is the benzothiazolyl radical, which may be substituted, by, for example, halogen atoms, again preferably chlorine or bromine atoms, nitro or lower alkoxy groups. Further suitable radicals are thiazolinyl, thiazinyl and thiadiazolyl radicals.

The preferred Y radicals are lower alkylene groups containing 1, 2, 3 or 4 carbon atoms, which may be substituted by, e.g., a hydroxyl or a lower alkylcarbonyloxy group, or a radical of formula

—CH$_2$CH$_2$—O—CH$_2$CH$_2$—.

Phenyl radicals, as substituents on the dye molecule, may be substituted, e.g., by chlorine or bromine atoms, nitro, thiocyano, cyano, lower alkyl or alkoxy groups, acyl or acylamino radicals (acyl as defined above).

The dyes are produced by diazotizing an amine of formula

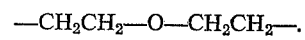

(II)

and coupling the diazonium compound thus formed with a compound of formula

(III)

The narrower choice of dyes among those of this invention correspond to the formula

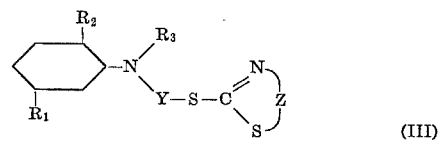

(IV)

where D stands for a benzothiazolyl radical which may be substituted by a cyano, thiocyano, alkoxy, alkylthio, alkylcarbonyl, alkoxycarbonyl, alkylsulphonyl, hydroxyalkylsulphonyl, cyanalkylsulphonyl or alkylaminosulphonyl group, a thiazolyl radical which may be substituted by a chlorine or bromine atom or an alkyl, cyano, nitro, N-morpholinoalkyl or alkylsulphonyl group, a 1, 2, 4-thiadiazolyl radical which may be substituted by an alkylsulphonyl group, a 1, 3, 4-thiadiazolyl radical which may be substituted by a chlorine or bromine atom or an alkylthio, alkylsulphonyl or phenylsulphonyl group, a thiophenyl radical which may be substituted by a nitro, alkylcarboinyl, alkylsulphonyl or alkylaminosulphonyl group, a pyrazolyl radical which may be substituted by a cyano or 4-nitrophenyl group, an imidazol or isothiazol radical which may be substituted by an alkyl or nitro group, or a triazole or tetrazol radical; $R_4$, for a hydrogen, chlorine or bromine atom, or an alkyl, alkoxy, formylamino, alkylcarbonylamino, alkoxycarbonylamino, alkoxyalkylcarbonylamino, cyanalkylcarbonylamino, phenoxyalkylcarbonylamino, benzylcarbonylamino, benzoylamino, nitrobenzoylamino, chlorobenzoylamino, phenoxycarbonylamino, alkylsulphonylamino, phenylsulphonylamino or toluylsulphonylamino group; $R_5$, for a hydrogen atom or an alkoxy group; $R_6$, for a hydrogen atom or an alkyl, cyanalkyl, chloralkyl, alkoxyalkyl, cyanalkoxyalkyl, cyclohexyl, alkylcarbonylalkyl, alkoxycarbonylalkyl, benzyl, phenoxyalkyl, pyridylethyl, aminocarbonylalkyl, alkylaminocarbonylalkyl, benzoylalkyl, alkenylsulphonylalkyl or toluylsulphonylalkyl group; $R_7$, for an alkylene, hydroxyalkylene or acetoxyalkylene group or a radical of formula —$CH_2CH_2$—O—$CH_2CH_2$—; $R_8$, for a hydrogen, chlorine or bromine atom; and $R_9$, for a nitro or ethoxy group of a hydrogen, chlorine or bromine atom.

In the radicals D and $R_4$ to $R_7$ alkyl, alkenyl and alkoxy represent lower radicals, i.e. containing 1, 2, 3 or 4 carbon atoms.

The dyes of Formula IV are produced by diazotizing an amine of formula

and coupling with a compound of formula

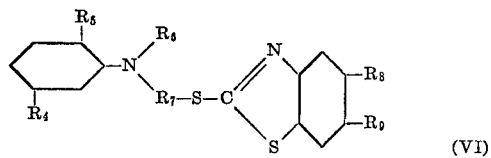

The coupling reaction generally takes place in acid, if necessary buffered medium with cooling, for example at 0–5° C. Sodium acetate is a suitable buffering agent.

The dyes are worked up into dye preparations by the normal methods, e.g. by grinding in the presence of dispersing agents and/or fillers, and are subsequently vacuum or jet dried. After the addition of a suitable volume of water the dyeing preparations can be applied to the fibres by exhaustion dyeing, padding or printing processes at a long or short liquor to goods ratio.

From aqueous dispersion the dyes build up excellently on textile of fully synthetic or semi-synthetic hydrophobic organic substances of high molecular weight. They are well suitable for dyeing and printing textiles of linear aromatic polyester fibres, cellulose acetate, cellulose triacetate and synthetic polyamide fibres. They are also dyeable on polyolefins, acrylonitrile copolymer fibres, and polyvinyl compounds.

The known dyeing and printing methods are used, for example those described in French Pat. 1,445,371. The dyeings obtained have very good all-round fastness, being especially fast to thermofixation, sublimation, pleating, ozone, solvents, lubricants, dry heat, chlorine, rubbing and cross dyeing. They also have very good wet fastness properties, e.g. fastness to water, sea water, perspiration and washing.

The reserve of wool and the gas fume and light fastness properties merit special note. The dyes are extremely stable to the various forms of the permanent press finishing process.

In the examples the parts are by weight and the temperatures in degrees centigrade.

EXAMPLE 1

22 parts of 2-amino-6-methylsulphonylbenzothiazole are stirred into 300 parts of glacial acetic acid and diazotized with 8 parts of sodium nitrile in concentrated sulphuric acid. 3 parts of urea are added and the diazonium compound formed is coupled with 32 parts of 1-(2'-benzothiazolylmercapto) - 2 - (N-ethyl-N - 3″ - methylphenylamino)-ethane in glacial acetic acid. The resulting dye is filtered off, washed free of acid and dried. Applied from aqueous dispersion to polyester fibres, it gives dyeings of rubine shade which have excellent fastness properties, in particular fastness to thermofixation.

EXAMPLE 2

In place of the 1-(2'-benzothiazolyl-mercapto)-2-(N-ethyl-N-3″-methylphenylamino)-ethane used in Example 1, the equivalent amount of 1-(6'-ethoxy-2'-benzothiazolylmercapto)-2-(N-ethyl-N - 3″ - methylphenylamino)-ethane can be employed and the procedure of Example 1 followed in all other particulars, on which a dye with similar properties is obtained.

EXAMPLE 3

7.6 parts of sodium nitrite are added to 100 parts of concentrated sulphuric acid and the temperature raised to 65°. On cooling to 5° 100 parts of a mixture of 15 parts of propionic acid and 85 parts of glacial acetic-acid are added with stirring, the temperature being allowed to rise to 15°, on which this temperature is held until the addition is complete. The mixture is then cooled at once to 0–5°. 14.5 parts of 2-amino-5-nitrothiazole are added, followed by 100 parts of the aforementioned propionic acid-glacial acetic acid mixture, after which the charge is stirred for 3 hours at 0–5°. The excess nitrite is decomposed by the addition of urea and the diazonium salt solution run with stirring into a solution, cooled to 0–5°, of 31 parts of 1-(2'-benzothiazolyl-mercapto)-2-(N-ethyl-N-phenylamino)-ethane in a mixture of propionic acid and glacial acetic acid in the ratio of 1:6. After a short time the mixture is adjusted acid to Congo paper with sodium acetate and stirred for a further 2–3 hours. It is then run into ice-water, and the precipitated dye is filtered off, washed with water and dried.

EXAMPLE 4

9.75 parts of 2-amino-6-nitrobenzothiazole are suspended in 60 parts of water, 131 parts of concentrated sulphuric acid are added to the suspension, and it is then cooled to —5°. A solution of 4.2 parts of sodium nitrite in 46.4 parts of concentrated sulphuric acid is added with cooling to 0°, after which the mixture is stirred for 2 hours at the same temperature. The diazonium salt solution is allowed to drop slowly with stirring into 16 parts of 1-(2'-benzothiazolyl-mercapto)-2-(N-ethyl-N-3″-methylphenylamino)-ethane in a propionic acid-acetic acid mixture in the ratio 1:5 at 0°. After 3 hours the mixture is poured into ice-water and the precipitated dye filtered off, washed with water and dried.

EXAMPLE 5

14.5 parts of 2-amino-5-nitrothiazole are added in portions to 150 parts of concentrated sulphuric acid cooled to 0–5. To the resulting solution is added dropwise a solution of nitrothiazole sulphuric acid, prepared by slowly adding 7.6 parts of sodium nitrite to 100 parts of concentrated sulphuric acid with stirring, allowing the temperature to rise to 65°, cooling to 50° and stirring for 3 hours. The combined solution is coupled with 32 parts of 1-(2'-benzothiazolyl-mercapto)-2-(N-ethyl-N-3″-methylphenylamino)-ethane in glacial acetic acid. Aqueous sodium acetate solution is added slowly until the reaction is neutral to Congo paper. The dye settles out and is filtered off, washed until neutral and dried.

In the following table details are given of further dyes corresponding to the application, which are of formula

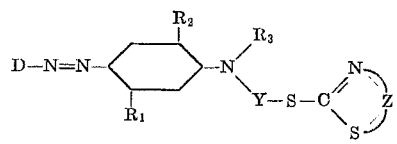

TABLE

| Example No. | D | R₁ | R₂ | R₃ | Y | Z |
|---|---|---|---|---|---|---|
| 6 | 2-cyano-3-methylthiazolyl-2 | —NH—COOC₂H₅ | H | —CH₂CH₂OCH₂CH₂CN | —CH₂CH₂— | 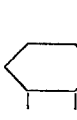 |
| 7 | 6-methylsulphonylbenzothiazolyl-2 | H | H | —C₂H₅ | —CH₂CH₂— | Same. |
| 8 | do | —CH₃ | H | —CH₂CH₂CN | —CH₂CH₂— | Do. |
| 9 | do | —NH—SO₂——CH₃ | H | —CH₃ | —CH₂CH₂—O—CH₂CH₂ | Do. |
| 10 | 6-dimethylaminosulphonylbenzothiazolyl-2 | —CH₃ | H | —C₂H₅ | —CH₂CH₂— | Do. |
| 11 | 6-nitrobenzothiazolyl-2 | —NH—CO—⌬—Cl | —OCH₃ | —CH₂CH₂—O—C₆H₅ | —CH₂CH₂— | Do. |
| 12 | 6-methylthiobenzothiazolyl-2 | —NH—SO₂—CH₃ | H | —CH₂CH₂—SO₂—CH=CH₂ | —CH₂CH₂— | Do. |
| 13 | 5,6-dimethoxybenzothiazolyl-2 | H | H | —CH₂CH₂—Cl | —CH₂CH₂— | Do. |
| 14 | Benzothiazolyl-2 | —NHCOO—C₂H₅ | H | —CH₃ | —CH₂CH—CH₂ <br> OH | Do. |
| 15 | 6-β-cyanoethylsulfonylbenzothiazolyl-2 | —CH₃ | H | —C₂H₅ | —CH₂CH₂— | Do. |
| 16 | 4-phenyl-5-nitrothiazolyl-2 | —OCH₃ | —OCH₃ | —C₂H₅ | —CH₂—CH— <br> CH₃ | Do. |
| 17 | 5-N-morpholinoethylthiazolyl-2 | —CH₃ | H | —C₂H₅ | —CH₂CH₂— | Do. |
| 18 | 4-methylthiazolyl-2 | —NH—CO—CH₃ | —OC₂H₅ | —C₂H₅ | —CH₂CH₂— | Do. |
| 19 | 5-bromothiazolyl-2 | —NH—CO—CH₂CH₃ | H | —C₂H₅ | —CH₂CH₂—O—CH₂CH₂— | Do. |
| 20 | 5-methylsulphonylthiazolyl-2 | —CH₃ | —CH₃ | —C₂H₅ | —CH₂CH₂— | Do. |
| 21 | 3-methylthio-1,2,4-thiadiazolyl-5 | —NH—CO—CH₃ | —OC₂H₅ | —CH₂CH₂—CO—NH—CH₃ | —CH₂—CH—CH₂— <br> OH | Do. |
| 22 | 3-ethylsulfonyl-1,2,4-thiadiazolyl-5 | —NH—SO₂—C₂H₅ | —OCH₃ | —CH₃ | —CH₂CH— <br> CH₃ | Do. |
| 23 | 2-methylsulphonyl-1,3,4-thiadiazolyl-5 | H | H | —C₂H₅ | —CH₂CH₂— | Do. |
| 24 | 2-methylthio-1,3,4-thiadiazolyl-5 | —NHCHO | H | —CH₃ | —CH₂—CH—CH₂— <br> OCOCH₃ | Do. |
| 25 | 2-chloro-1,3,4-thiadiazolyl-5 | —CH₃ | H | —CH₃ | —CH₂CH₂— | Do. |
| 26 | 3-nitrothiophenyl-2 | —NH—CHO | H | —C₂H₅ | —CH₂CH₂ | 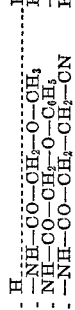 |
| 27 | 5-dimethylaminosulphonylthiophenyl-2 | —NH—CO—C₂H₅ | H | —C₂H₅ | —CH₂CH₂— |  |
| 28 | 6-nitrobenzothiazolyl-2 | H | H | —C₂H₅ | —CH₂CH₂— | Same. |
| 29 | do | —NH—CO—CH₂—O—CH₃ | H | —C₂H₅ | —CH₂CH₂— | Do. |
| 30 | 6-methylsulphonylbenzothiazolyl-2 | —NH—CO—CH₂—O—C₆H₅ | —C₂H₅ | —CH₃ | —CH₂CH₂— | Do. |
| 1 | 5-nitrothiazolyl-2 | —NH—CO—CH₂—CH₂—CN | H | H | —CH₂CH₂— | Do. |

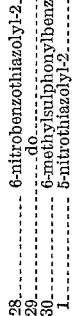

TABLE—Continued

| Example No. | D | $R_1$ | $R_2$ | $R_3$ | Y | Z |
|---|---|---|---|---|---|---|
| 32 | do | $-CH_3$ | H | $-CH_2-CH_2-$  | $-CH_2CH_2-$ | Do. |
| 33 | 3-nitro-5-ethylaminosulphonylthiophenyl-2 | $-CH_3$ | H | $-C_2H_5$ | $-CH_2CH_2-$ | Do. |
| 34 | 6-thiocyanobenzothiazolyl-2 | $-NH-CHO$ | H | $-C_2H_5$ | $-CH_2CH_2-$ | Do. |
| 35 | 6-methylsulphonylbenzothiazolyl-2 | $-CH_3$ | H | $-CH_2CH_2-CONH_2$ | $-CH_2CH_2-$ | Do. |
| 36 | 5-nitrothiazolyl-2 | $-CH_3$ | H | $-CH_2CH_2SO_2-CH=CH_2$ | $-CH_2CH_2-$ | Do. |
| 37 | 1-methyl-4-cyanopyrazolyl-5 | $-CH_3$ | H | $-C_2H_5$ | $-CH_2CH_2-$ | Do. |
| 38 | 1-methyl-4-nitroimidazolyl-5 | $-Cl$ | H | $-CH_2CH_2-Cl$ | $-CH_2CH_2-$ | Do. |
| 39 | Triazolyl-5 | $-NH-CO-CH_3$ | $-OC_2H_5$ | $-CH_2CH-CH_2OCH_3$ <br> $\quad\quad OCH_3$ | $-CH_2CH_2-$ | Do. |
| 40 | 3-methyl-4-nitroisothiazolyl-5 | $-NH-CO-C_2H_5$ | H | $-C_2H_5$ | $-CH_2CH_2-$ | Do. |
| 41 | Benzothiazolyl-2 | H | H | $-CH_2-C_6H_5$ | $-CH_2CH_2-$ | Do. |
| 42 | do | $-CH_3$ | H | Cyclohexyl | $-CH_2CH_2-$ | Do. |
| 43 | 2-phenylsulphonyl-1,3,4-thiodiazolyl-5 | $-CH_3$ | H | $-CH_2CH_2COCH_3$ | $-CH_2CH_2-$ | Do. |
| 44 | 6-Methylsulphonylbenzothiazolyl-2 | H | H | $-CH_2CH_2COOC_2H_5$ | $-CH_2CH_2-$ | Do. |
| 45 | 5-nitrothiazolyl-2 | $-CH_3$ | H | $-CH_2CH_2-CO-C_6H_5$ | $-CH_2CH_2-$ | Do. |
| 46 | 6-methylsulphonylbenzthiazolyl-2 | $-CH_3$ | H | $-C_2H_5$ | $-CH_2CH_2-$ | Do. |
| 47 | 3-nitro-5-acetylthiophenyl-2 | H | H | | $-CH_2CH_2-$ | Do. |
| 48 | 6-methylsulphonylbenzthiazolyl-2 | $-NHCOC_2H_5$ | H | $-C_2H_5$ | $-CH_2CH_2-$ | |
| 49 | do | $-CH_3$ | H | $-C_2H_5$ | $-CH_2CH_2-$ | |
| 50 | 5-nitro-thiazolyl-2 | $-CH_3$ | H | $-C_2H_5$ | $-CH_2CH_2-$ | |
| 51 | 6-methylsulphonylbenzthiazolyl-2 | $-Cl$ | H | $-CH_2CH_2CH_3$ | $-CH_2CH_2-$ | Same. |
| 52 | 1,3,4-thiodiazolyl-2 | $-CH_3$ | H | $-CH_3$ | $-CH_2CH_2-$ | |
| 53 | 4-methyl-thiazolyl-2 | $-NHCOCH_3$ | $-OC_2H_5$ | $-C_2H_5$ | $-CH_2CH_2-$ | |
| 54 | 6-methylsulphonyl-benzthiazolyl-2 | $-NHCOOC_2H_5$ | $-OC_2H_5$ | $-CH_2C_6H_5$ | $CH_2CH_2-$ | |

TABLE—Continued

| Example No. | D | R₁ | R₂ | R₃ | Y | Z |
|---|---|---|---|---|---|---|
| 55 | 6-cyano-benzthiazolyl-2 | —NHCOCH₃ | —OC₂H₅ | —C₂H₅ | —CH₂CH₂— | -C₆H₄-NO₂ (p) |
| 56 | 3-methyl-1,2,4-thiadiazolyl-5 | —NHCO-C₆H₄-NO₂ | H | —CH₂CH₂—O—CH₂CH₃ | —CH₂CH₂— | —CH₂—CH(CH₃)—CH₂— (?) (—CH₂—CH₂—CH₂—) |
| 57 | Thiophenyl-2 | —CH₃ | H | —CH₃ | —CH₂CH₂— | -C₆H₄-OC₂H₅ |
| 58 | Tetrazolyl-5 | —NHCOOC₂H₅ | C₂H₅ | —CH₃ | —CH₂CH₂— | -C₆H₄-Cl |
| 59 | 6-benzoyl-benzthiazolyl-2 | H | H | C₂H₅ | —CH₂CH₂— | —CH₂—CH₂—OCH₃ |
| 60 | 6-thiocyano-benzthiazolyl-2 | —CH₃ | H | C₂H₅ | —CH₂CH₂— | N=C-NHC₆H₅ |
| 61 | Benzthiazolyl-2 | —OCH₃ | —OCH₃ | —C₂H₅ | —CH₂CH₂— | N=C-S-CH₃ |
| 62 | 5-nitro-thiazolyl-2 | H | H | —CH₂CH₂-SO₂-C₆H₄-CH₃ | —CH₂CH₂— | —CH₂—CH₂—OCH₃ |
| 63 | 1-(4'-nitrophenyl)-4-cyanopyrazolyl-5 | H | H | —CH₃ | —CH₂CH₂— | -C₆H₄-Cl |
| 64 | Tetrazolyl-5 | —NH—SO₂CH₃ | H | —C₂H₅ | —CH₂CH₂— | -C₆H₄-OC₂H₅ |
| 65 | 6-methylsulphonylbenzthiazolyl-2 | —CH₃ | H | —C₂H₅ | —CH₂CH₂— | -C(CH₃)=CH- |

Representative dyestuffs of the foregoing examples are as follows:

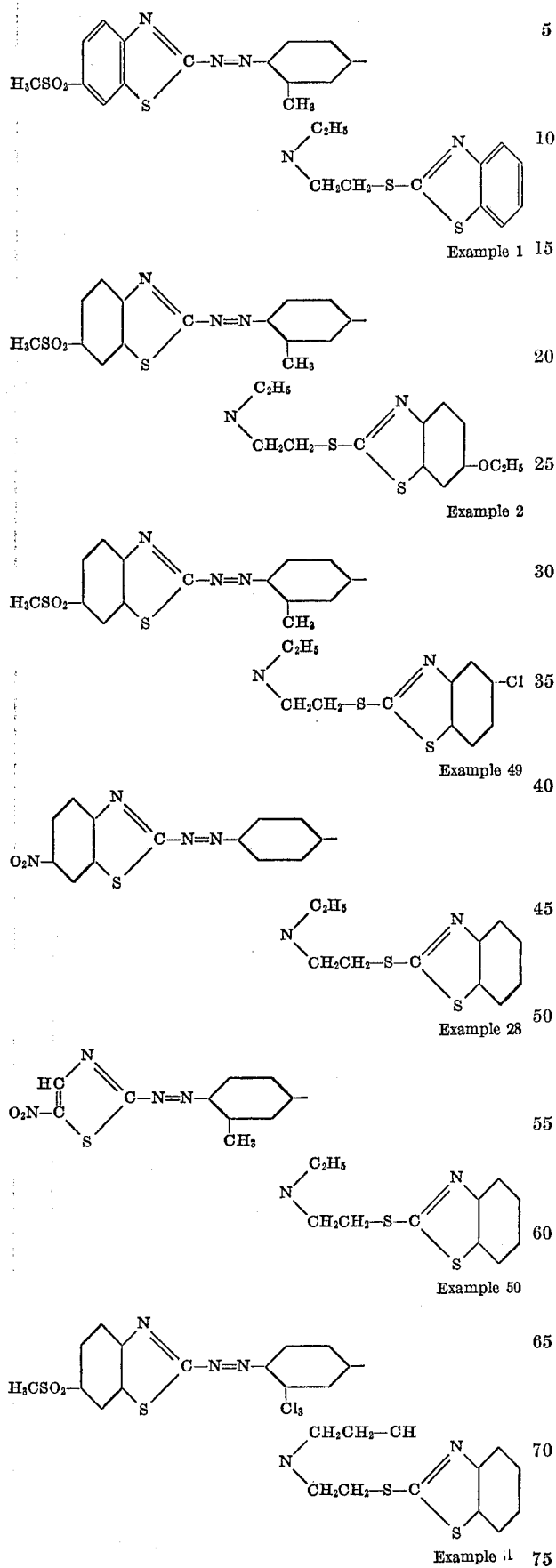
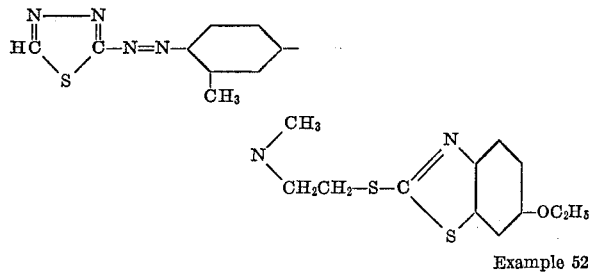
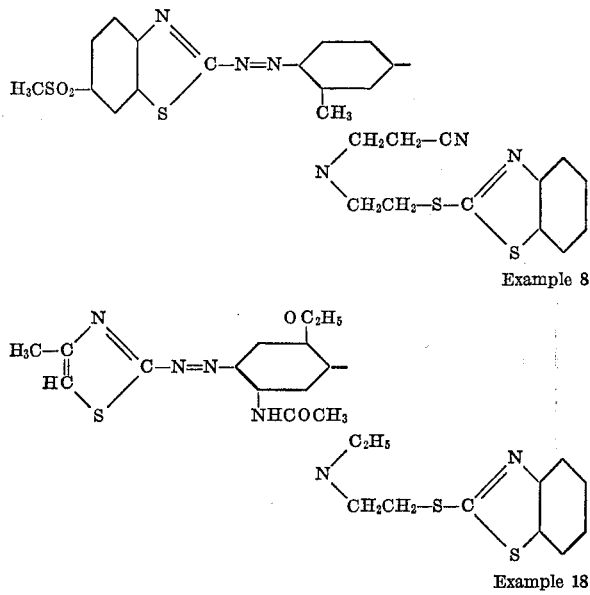

Having thus disclosed the invention, what we claim is:

1. Dyestuff free from carboxylic and sulfonic acid groups and of the formula

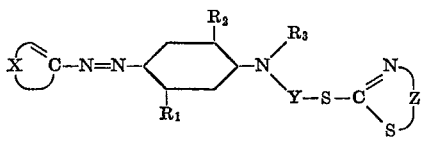

wherein

R₁ is a member selected from the group consisting of hydrogen, chloro, bromo, alkyl, alkoxy and —NH—acyl;

R₂ is a member selected from the group consisting of hydrogen, chloro, bromo, alkyl and alkoxy;

R₃ is a member selected from the group consisting of hydrogen, alkyl, alkenyl and cyclohexyl;

is either a substituted or unsubstituted member selected from the group consisting of thiazolyl, isothiazolyl, benzothiazolyl, thiophenyl, imidazolyl, 1,2,4-thiadiazolyl, 1,3,4-thiadiazolyl, pyrazolyl, triazolyl and tetrazolyl, any substituent on a substituted member being selected from the group consisting of chloro, bromo, nitro, cyano, thiocyano, alkyl, alkoxy, alkylthio, N-morpholinoalkyl, acyl and acylamino;

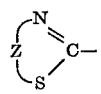

is either a substituted or unsubstituted member selected from the group consisting of benzothiazolyl, thiazolinyl, thiazinyl and thiadiazinyl, any substituent on a substituted member being selected from the group consisting of chloro, bromo, nitro and alkoxy; and Y is either a substituted or unsubstituted member selected from the group consisting of lower alkylene and lower alkylene interrupted by an oxygen atom, any substituent of a substituted member being selected from the group consisting of hydroxy and alkylcarbonyloxy;

each alkyl, each alkoxy and each cyclohexyl being either substituted or unsubstituted, any substituent thereon being a member selected from the group consisting of chloro, bromo, alkoxy, cyanalkoxy, pyridyl, cyano, hydroxy, acyl, phenyl and phenoxy;

each phenyl substituent being either substituted or unsubstituted, any substituent thereon being selected from the group consisting of chloro, bromo, nitro, thiocyano, cyano, alkyl, alkoxy, acyl and acylamino;

each acyl being either R—P— or R'—Q—, wherein

R is a member selected from the group consisting of alkyl, alkenyl and phenyl;

P is a member selected from the group consisting of —O—CO— and —SO$_2$—;

R' is a member selected from the group consisting of hydrogen and R;

Q is a member selected from the group consisting of —CO—, —NR"—CO— and —NR"—SO$_2$—; and R" is a member selected from the group consisting of hydrogen and R; and each alkyl, each alkoxy and each alkenyl having from 1 to 4 carbon atoms.

2. Dyestuff according to claim 1 of the formula

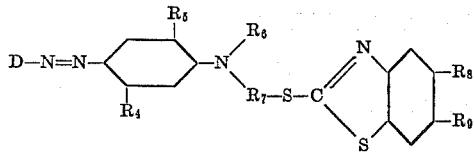

wherein

D is a substituted or unsubstituted member selected from the group consisting of (a) benzothiazolyl, any substituent of which is selected from the group consisting of cyano, thiocyano, alkoxy, alkylthio, alkylcarbonyl, alkoxycarbonyl, alkylsulphonyl, hydroxyalkylsulphonyl, cyanalkylsulphonyl and alkylaminosulphonyl; (b) thiazolyl, any substituent of which is selected from the group consisting of chloro, bromo, alkyl, cyano, nitro, N-morpholinoalkyl and alkylsulphonyl; (c) 1,2,4-thiadiazolyl, any substituent of which is selected from the group consisting of alkylthio and alkylsulphonyl; (d) 1,3,4-thiadiazolyl, any substituent of which is selected from the group consisting of chloro, bromo, alkylthio, alkylsulphonyl and phenylsulphonyl; (e) thiophenyl, any substituent of which is selected from the group consisting of nitro, alkylcarbonyl, alkylsulphonyl and alkylaminosulphonyl; (f) pyrazolyl, any substituent of which is selected from the group consisting of cyano and 4-nitrophenyl; (g) imidazolyl, any substituent of which is selected from the group consisting of alkyl and nitro; (h) isothiazolyl, any substituent of which is selected from the group consisting of alkyl and nitro; (i) triazolyl; and (j) tetrazolyl;

R$_4$ is a member selected from the group consisting of hydrogen, chloro, bromo, alkyl, alkoxy, formylamino, alkylcarbonylamino, alkoxycarbonylamino, alkoxyalkylcarbonylamino, cyanalkylcarbonylamino, phenoxyalkylcarbonylamino, benzylcarbonylamino, benzoylamino, nitrobenzoylamino, chlorobenzoylamino, phenoxycarbonylamino, alkylsulphonylamino, phenylsulphonylamino and toluylsulphonylamino;

R$_5$ is a member selected from the group consisting of hydrogen and alkoxy;

R$_6$ is a member selected from the group consisting of hydrogen, alkyl, cyanalkyl, chloralkyl, alkoxyalkyl, cyanalkoxyalkyl, cyclohexyl, alkylcarbonylalkyl, alkoxycarbonylalkyl, benzyl, phenoxyalkyl, pyridylethyl, aminocarbonylalkyl, alkylaminocarbonylalkyl, benzoylalkyl, alkenylsulphonylalkyl and toluylsulphonylalkyl;

R$_7$ is a member selected from the group consisting of alkylene, hydroxyalkylene, acetoxyalkylene and —CH$_2$CH$_2$—O—CH$_2$CH$_2$—;

R$_8$ is a member selected from the group consisting of hydrogen, chloro and bromo;

R$_9$ is a member selected from the group consisting of hydrogen, nitro, ethoxy, chloro and bromo; and each alkyl, each alkoxy and each alkenyl having from 1 to 4 carbon atoms.

3. The dyestuff according to claim 2 of the formula

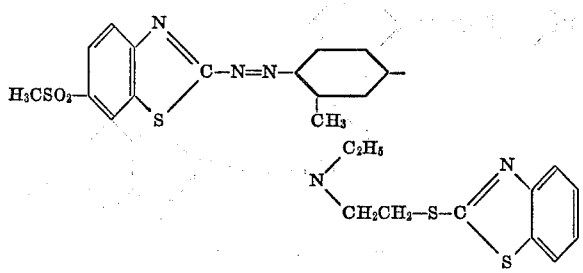

4. The dyestuff according to claim 2 of the formula

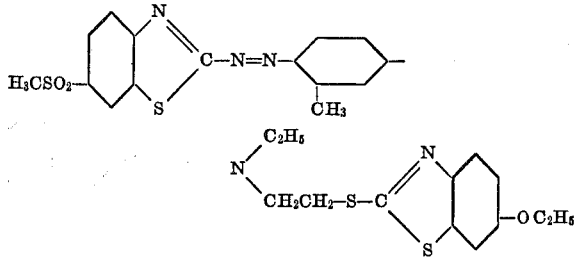

5. The dyestuff according to claim 2 of the formula

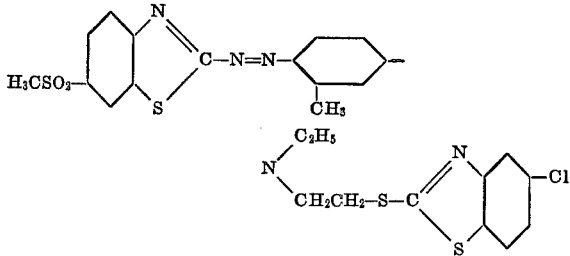

6. The dyestuff according to claim 2 of the formula

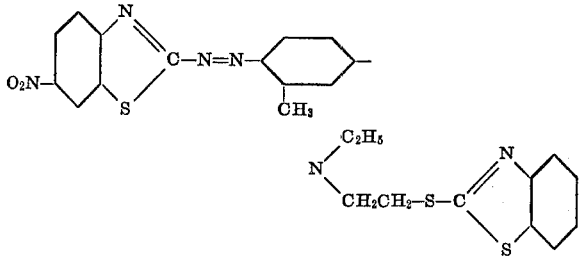

7. The dyestuff according to claim 2 of the formula

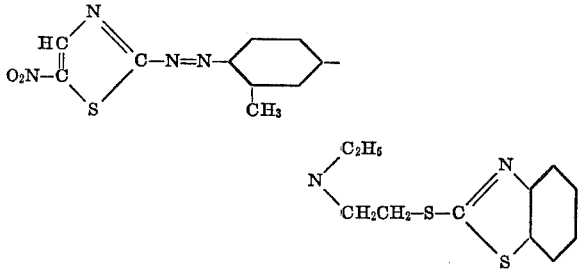

8. The dyestuff according to claim 2 of the formula

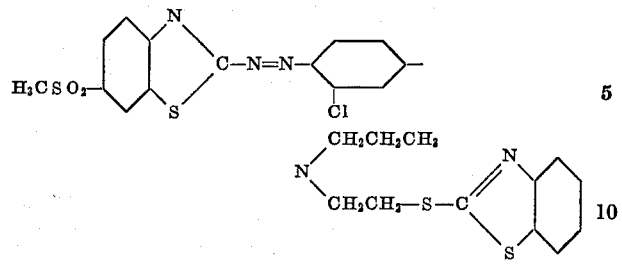

9. The dyestuff according to claim 2 of the formula

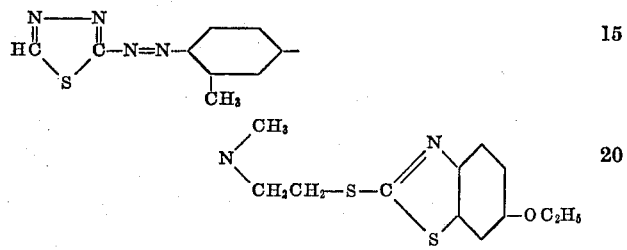

10. The dyestuff according to claim 2 of the formula

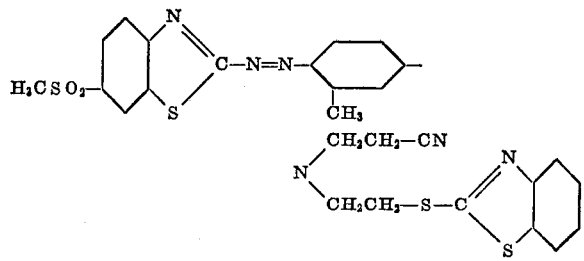

11. The dyestuff according to claim 2 of the formula

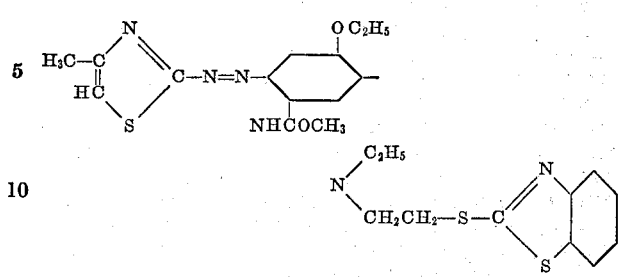

References Cited
UNITED STATES PATENTS

| | | | |
|---|---|---|---|
| 2,464,785 | 3/1949 | Thompson | 260—158 |
| 2,868,775 | 1/1951 | Straley et al. | 260—158X |
| 3,099,652 | 7/1963 | Straley et al. | 260—158X |
| 3,101,988 | 8/1963 | Bossard et al. | 260—158X |
| 3,161,631 | 12/1964 | Straley et al. | 260—158 |
| 3,177,198 | 4/1965 | Weis et al. | 260—152 |
| 3,383,380 | 5/1968 | Straley et al. | 260—158 |
| 3,480,641 | 11/1969 | Schundehutte et al. | 260—158X |

FOREIGN PATENTS 1,445,371 5/1966 France _____ 260—156

FLOYD DALE HIGEL, Primary Examiner

U.S. Cl. X.R.

8—4, 41, 48, 71; 117—138.8, 144; 260—37, 40, 41, 156, 157

UNITED STATES PATENT OFFICE
CERTIFICATE OF CORRECTION

Patent No. 3,595,852    Dated  July 27th, 1971

Inventor(s) RASSO HAHN AND CURT MUELLER

It is certified that error appears in the above-identified patent and that said Letters Patent are hereby corrected as shown below:

Column 1, line 41, "atoms" should read --atom--; line 45, "atoms" should read --atom--; line 57, "Th ealkyl" should read --The alkyl--. Column 2, line 64, "an al-" should read --an alkylthio or al- --;
line 69, "alkylcarboinyl" should read --alkylcarbonyl--. Column 3, line 73, "nitrile" should read --nitrite--. Column 4, line 56, "0-5." should read --0-5°.--. Column 6, example 31, "1" should read --31--. Column 11, line 70, "$CH_2CH_2$-CH" should read --$CH_2CH_2CH_3$--; "$Cl_3$" should read --Cl--;   line 75, "Example 1" should read --Example 51--. Column 13, line 73, "alkovyalkyl" should read --alkoxyalkyl--. Column 14, line 55, " 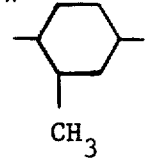 " should read -- 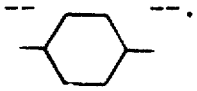 --.

Signed and sealed this 26th day of December 1972.

(SEAL)
Attest:

EDWARD M.FLETCHER,JR.                ROBERT GOTTSCHALK
Attesting Officer                    Commissioner of Patents